No. 751,418. PATENTED FEB. 2, 1904.
F. E. RUCKDESCHEL.
EYEGLASS OR SPECTACLE ATTACHMENT.
APPLICATION FILED JUNE 13, 1903.
NO MODEL.
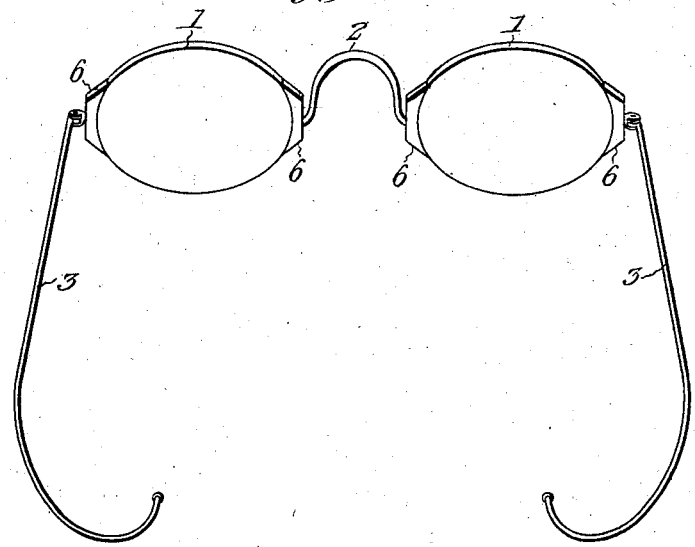
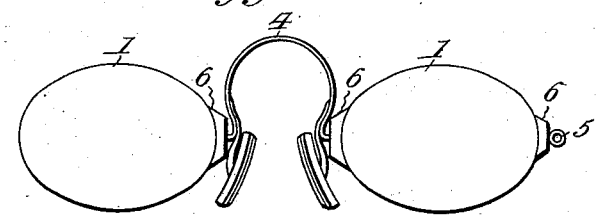
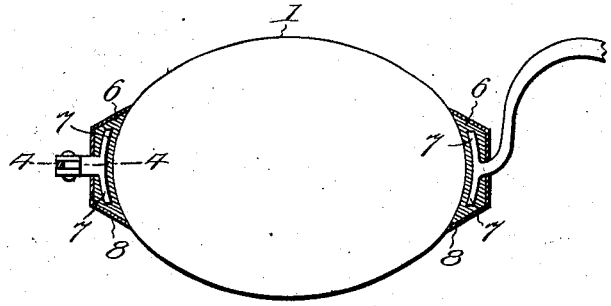
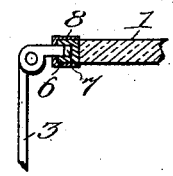
Witnesses
Edwin F. McKee
Chas. S. Hyer
Inventor
Fred E. Ruckdeschel
By Victor J. Evans
Attorney
THE NORRIS PETERS CO., PHOTO-LITHO., WASHINGTON, D. C.

No. 751,418. Patented February 2, 1904.

UNITED STATES PATENT OFFICE.

FREDERICK E. RUCKDESCHEL, OF ROCHESTER, NEW YORK, ASSIGNOR OF TWO-THIRDS TO HARRIS JOFFE AND ABRAHAM D. JOFFE, OF ROCHESTER, NEW YORK.

EYEGLASS OR SPECTACLE ATTACHMENT.

SPECIFICATION forming part of Letters Patent No. 751,418, dated February 2, 1904.

Application filed June 13, 1903. Serial No. 161,391. (No model.)

*To all whom it may concern:*

Be it known that I, FREDERICK E. RUCKDESCHEL, a citizen of the United States, residing at Rochester, in the county of Monroe and State of New York, have invented new and useful Improvements in Eyeglass or Spectacle Attachments, of which the following is a specification.

This invention relates to eyeglasses, spectacles, and the like, and more particularly to frameless devices of this class, and has for its object to firmly secure the lenses and their uniting and supporting parts without drilling holes in the lenses to receive screws, rivets, or similar fastenings or in any wise indenting or disturbing the integrality of the lenses to secure the correlative parts thereto.

The invention consists in forming a paste of about two-thirds powdered glass and one-third glue wherein the parts of the spectacles, including the supports, bridges, and nose-springs, are terminally embedded, the composition being first shaped to form a connector and is then applied, carrying parts of the eyeglasses or spectacles therewith, to the edges of the lenses and permitted to harden. The connectors while hardening in contact with the edges of the lenses firmly adhere to the latter with such tenacity as to resist ordinary wear and tear and maintain the usual eyeglass and spectacle attachments in connection with the lenses. After the connectors are fully dry and hard they are coated with white lead, particularly at the joints, to avoid the ingress to the joints of water or moisture. While it is unnecessary to apply anything further to the connector in view of its practicability for the purpose intended, irrespective of auxiliary features, it will be preferred at times to fit hoods over the connectors, said hoods being of brass, copper, or other suitable thin metal.

In the drawings, Figure 1 is a perspective view of a pair of spectacles embodying the features of the invention. Fig. 2 is an elevation of a pair of eyeglasses embodying the features of the invention. Fig. 3 is a detail view of a lens, on an enlarged scale, showing the improved connectors applied thereto and the supporting parts for the lenses secured within the connectors, the latter being in section. Fig. 4 is a horizontal section on the line 4 4, Fig. 3.

Similar numerals of reference are employed to indicate corresponding parts in the several views.

The numeral 1 designates lenses of the form usually employed in connection with spectacles or eyeglasses. The bridge 2 for the spectacles, temples 3, and the nose-spring 4 and chain or cord attachment 5 for the eyeglasses are secured to the lenses 1 by the improved connectors 6, or the connectors are of similar form and composed of a mixture of two-thirds powdered glass and one-third glue. The glue used may be of any suitable nature, and the terminals of the bridge, temple connections, and nose-spring, as well as the attaching devices 5, are formed with divergent arms or other projections 7, as clearly shown by Fig. 3. The arms or other projections 7 of the terminal of the nose-bridge, temple, or nose-spring are inserted in the connector while it is in soft condition, and said connector is then shaped as may be desired and applied to the edge of the lenses, as shown, and permitted to dry or harden. A coating of white lead, which cannot be discerned in the drawings, is then applied to the joint formed between the connector and the lens to prevent the entrance of moisture into the joint. In this condition the connector may be used for practically holding the attachments of spectacles and eyeglasses in connection with the lenses without further auxiliaries, and it will be found advantageous in many instances to employ a sheathing or covering for each connector consisting of a suitably shaped and prepared piece 8 of sheet-brass, copper, or other suitable metal, which may be plated to correspond to the remaining attachment secured to the lenses.

It will be observed that by the use of the connector the formation of perforations or indentions in the lenses to attach the different parts of spectacles and eyeglasses will be avoided, and hence weakening of the lenses will be prevented. Furthermore, the use of posts and a consequent reduction in the use of parts will be dispensed with, and less metal in the spectacles or eyeglass attachments will be used, with the additional advantage of lightening the general structure and at the same time materially reducing the cost of the same. The proportions of the several connectors may be varied at will, and molds or flasks suitable for the purpose may be employed to shape the connectors having the attachments held thereby.

Having thus fully described the invention, what is claimed as new is—

1. In devices of the class set forth, the combination with lenses, of a hardened composition of ground glass and glue applied thereto to serve as connecting means, and attaching means for the lenses having angular terminal projections embodied within the said hardened composition.

2. The combination with spectacle or eyeglass lenses, of a hardened composition of ground glass and glue applied to the ends of the lenses, and attaching means for the lenses having terminal projections held within the said hardened composition.

3. The combination with lenses for spectacles or eyeglasses, of a hardened composition of ground glass and glue applied to the ends of the lenses to form connectors, attaching means for the lenses having terminals held within the said hardened composition, and a moisture-resisting material applied to the joints between the composition and lenses.

In testimony whereof I affix my signature in presence of two witnesses.

FRED. E. RUCKDESCHEL.

Witnesses:
M. E. MALLEY,
HARRIS JOFFE.